(12) United States Patent
Ha (10) Patent No.: US 11,042,203 B1
(45) Date of Patent: Jun. 22, 2021

(54) REGULATOR CIRCUIT AND FRONT-END MODULE

(71) Applicant: Samsung Electro-Mechanics Co., Ltd., Suwon-si (KR)

(72) Inventor: Sang Hoon Ha, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

(21) Appl. No.: 16/987,585

(22) Filed: Aug. 7, 2020

(30) Foreign Application Priority Data

Apr. 23, 2020 (KR) .................. 10-2020-0049337

(51) Int. Cl.
  *G06F 1/26* (2006.01)
  *H02M 1/08* (2006.01)
  *H02M 3/155* (2006.01)
  *H04B 1/40* (2015.01)

(52) U.S. Cl.
  CPC .............. *G06F 1/26* (2013.01); *H02M 1/08* (2013.01); *H02M 3/155* (2013.01); *H04B 1/40* (2013.01)

(58) Field of Classification Search
  CPC ........... G06F 1/26; H02M 1/08; H02M 3/155; H04B 1/40
  USPC ............................................ 327/331; 455/73
  See application file for complete search history.

(56) References Cited

U.S. PATENT DOCUMENTS

| 7,423,416 B1* | 9/2008 | Quinones | G05F 3/18 |
| | | | 323/314 |
| 2004/0140845 A1* | 7/2004 | Eberlein | G05F 1/575 |
| | | | 327/541 |
| 2007/0222425 A1* | 9/2007 | Kimura | G05F 1/46 |
| | | | 323/315 |
| 2017/0053702 A1* | 2/2017 | Caracciolo | G11C 16/12 |
| 2019/0115821 A1* | 4/2019 | Tomioka | H02M 3/156 |

FOREIGN PATENT DOCUMENTS

| KR | 10-0559248 B1 | 3/2006 |
| KR | 10-2006-0122286 A | 11/2006 |

* cited by examiner

*Primary Examiner* — William Hernandez
(74) *Attorney, Agent, or Firm* — NSIP Law (57) ABSTRACT

A regulation circuit is provided. The regulation circuit is embedded in a front-end module, and provides a regulated voltage to a decoder based on a power supply voltage. The regulation circuit includes a first current regulating circuit connected between a power supply voltage terminal and a first connection node and configured to regulate a level of a first current, a first voltage regulating circuit connected between the first connection node and a ground node, and configured to receive the first current to regulate a level of a first voltage, a second voltage regulating circuit connected between the power supply voltage terminal and an output node, and configured to generate an output voltage based on the first voltage, and a second current regulating circuit connected between the output node and the ground node, and configured to stabilize the output voltage.

18 Claims, 5 Drawing Sheets

REGULATOR CIRCUIT AND FRONT-END MODULE

CROSS-REFERENCE TO RELATED APPLICATION(S)

This application claims the benefit under 35 USC § 119(a) of Korean Patent Application No. 10-2020-0049337 filed on Apr. 23, 2020 in the Korean Intellectual Property Office, the entire disclosure of which is incorporated herein by reference for all purposes.

BACKGROUND

1. Field

The following description relates to a regulator circuit and a front-end module.

2. Description of Related Art

A W-Fi front-end module integrated circuit (Wi-Fi FEM IC) that is implemented in mobile communication devices, etc., is currently being widely developed. This development is being conducted in accordance with the trend for miniaturization of communication devices, and the demand for low power consumption with regard to communication devices.

Recently, in the Wi-Fi front-end module, in accordance with the trend for miniaturization and low power consumption, the task of excluding the existing power management integrated circuit (PMIC) and forming a direct connection to the battery of the communication device is implemented.

Accordingly, it may be beneficial to implement a manner of preventing damage to circuits and components inside the Wi-Fi front-end module.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In a general aspect, a regulation circuit includes a first current regulating circuit, connected between a power supply voltage terminal and a first connection node, and configured to regulate a level of a first current, a first voltage regulating circuit, connected between the first connection node and a ground node, and configured to receive the first current to regulate a level of a first voltage, a second voltage regulating circuit, connected between the power supply voltage terminal and an output node, and configured to generate an output voltage based on the first voltage; and a second current regulating circuit, connected between the output node and the ground node, and configured to stabilize the output voltage.

The first current regulating circuit may include a first resistor connected between the power supply voltage terminal and the first connection node.

The first voltage regulating circuit may be connected between the first connection node and the ground node, and may include a first transistor of which a drain and a gate are commonly connected.

The first voltage regulating circuit may include a first transistor, respectively connected to the first connection node and the second voltage regulating circuit, and configured to have a drain and a gate commonly connected to each other; a second transistor, connected to a source of the first transistor, and configured to have a drain and a gate commonly connected to each other; and a third transistor connected to a source of the second transistor, configured to have a drain and a gate commonly connected to each other, and configured to have a source connected to the ground node.

The second voltage regulating circuit may include an output transistor having a drain connected to the power supply voltage terminal, a gate connected to the first connection node, and a source connected to the output node.

The second current regulating circuit may include a ground resistor connected between the output node and the ground node.

The second current regulating circuit may include a ground transistor, configured to have a drain connected to the output node, and a source and a gate connected to the first voltage regulating circuit; and a ground resistor connected between the source of the ground transistor and the ground node.

A resistance value of the first resistor may be higher than a resistance value of the ground resistor.

In a general aspect, a front-end module includes a regulation circuit, configured to generate a regulated voltage based on a power supply voltage; and a decoder, configured to receive the regulated voltage from the regulation circuit, wherein the regulation circuit includes a first current regulating circuit, connected between a power supply voltage terminal and a first connection node, and configured to regulate a level of a first current, a first voltage regulating circuit, connected between the first connection node and a ground node, and configured to receive the first current to regulate a level of a first voltage, a second voltage regulating circuit, connected between the power supply voltage terminal and an output node, and configured to generate an output voltage based on the first voltage, and a second current regulating circuit, connected between the output node and the ground node, and configured to stabilize the output voltage.

The first current regulating circuit may include a first resistor connected between the power supply voltage terminal and the first connection node.

The first voltage regulating circuit may be connected between the first connection node and the ground node, and may include a first transistor having a drain and a gate commonly connected to each other.

The first voltage regulating circuit may include a first transistor, respectively connected to the first connection node and the second voltage regulating circuit and configured to have a drain and a gate commonly connected to each other; a second transistor, connected to a source of the first transistor, and configured to have a drain and a gate commonly connected to each other; and a third transistor connected to a source of the second transistor, and configured to have a drain and a gate commonly connected to each other, and a source connected to the ground node.

The second voltage regulating circuit may include an output transistor having a drain connected to the power supply voltage terminal, a gate connected to the first connection node, and a source connected to the output node.

The second current regulating circuit may include a ground resistor connected between the output node and the ground node.

The second current regulating circuit may include a ground transistor, configured to have a drain connected to the output node, and a source and a gate connected to the first voltage regulating circuit; and a ground resistor connected between the source of the ground transistor and the ground node.

In a general aspect, a communication device includes a front-end module comprising a regulation circuit and a decoder, wherein the regulation circuit includes a first current regulator, connected to a power supply voltage, and configured to regulate a level of a first current; a first voltage regulator, connected between the first regulator and a ground, and configured to receive the first current, and regulate a level of a first voltage; a second voltage regulator, connected to the power supply voltage, and configured to generate an output voltage based on the first voltage; and a second current regulator, connected between the second voltage regulator and the ground, and configured to stabilize the output voltage.

The first current regulator may include a first resistor, and the second current regulator may include a ground resistor, and a resistance value of the first resistor is greater than a resistance value of the ground resistor.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided so that this disclosure will be thorough and complete, and will fully convey the scope of the disclosure to one of ordinary skill in the art.

Herein, it is noted that use of the term "may" with respect to an embodiment or example, e.g., as to what an embodiment or example may include or implement, means that at least one embodiment or example exists in which such a feature is included or implemented while all examples and examples are not limited thereto.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as illustrated in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes illustrated in the drawings may occur. Thus, the examples described herein are not limited to the specific shapes illustrated in the drawings, but include changes in shape that occur during manufacturing.

The features of the examples described herein may be combined in various ways as will be apparent after gaining an understanding of the disclosure of this application. Further, although the examples described herein have a variety of configurations, other configurations are possible as will be apparent after an understanding of the disclosure of this application.

The drawings may not be to scale, and the relative sizes, proportions, and depiction of elements in the drawings may be exaggerated for clarity, illustration, and convenience.

Figure 1:
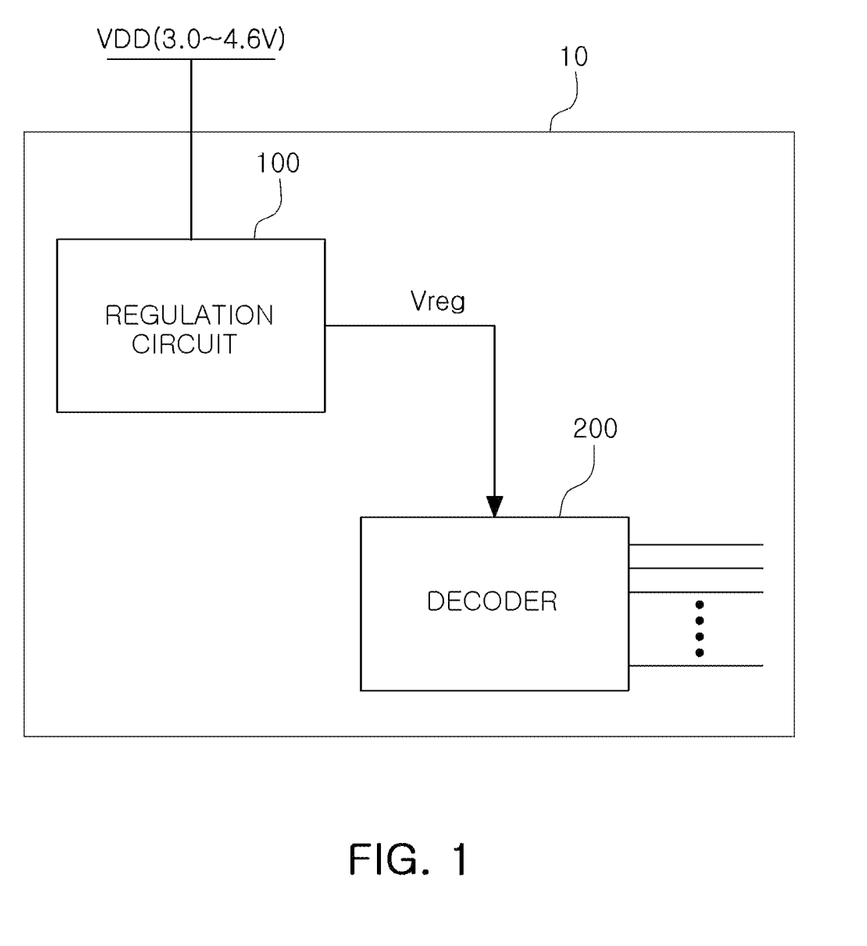
FIG. 1 illustrates an example front-end module, in accordance with one or more embodiments.

FIG. 1 illustrates an example front-end module, in accordance with one or more embodiments.

Referring to FIG. 1, a front-end module 10, according to an example, may directly receive a power supply voltage VDD, and may include a regulation circuit 100 and a decoder 200. In an example, the front-end module 10 may be a Wi-Fi front-end module, but is not limited thereto.

The regulation circuit 100 may generate a regulated voltage Vreg using the power supply voltage VDD. In an example, the power supply voltage VDD may be a battery voltage, and the battery voltage may, for example, vary within a range of 3.0V to 4.6V, but is not limited thereto.

The decoder 200 may receive the regulated voltage Vreg from the regulation circuit 100. In an example, the decoder 200 may be an internal circuit of the front-end module 10, and may be a control circuit, but is not limited thereto.

Figure 2:
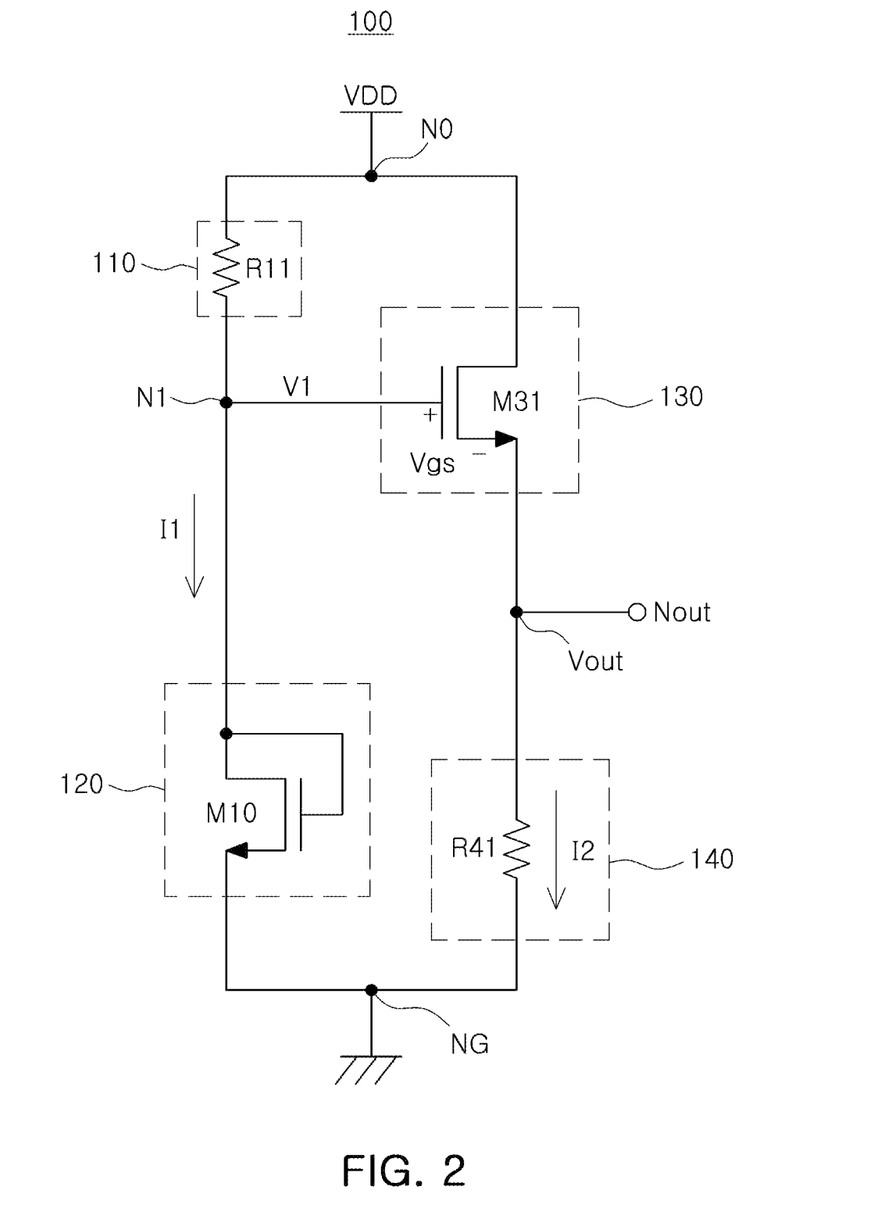
FIG. 2 illustrates an example regulator circuit, in accordance with one or more embodiments.
Figure 3:
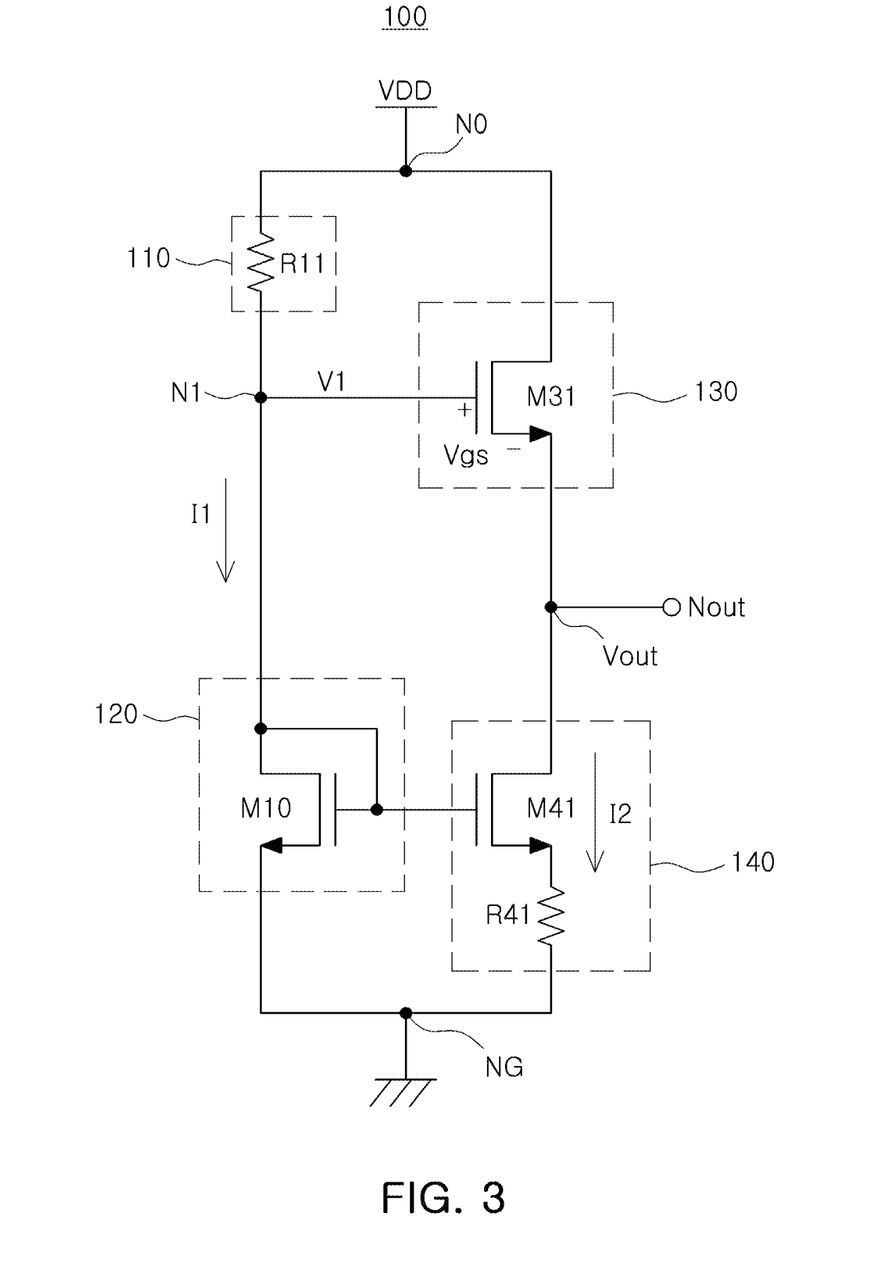
FIG. 3 illustrates an example regulator circuit, in accordance with one or more embodiments.
Figure 4:
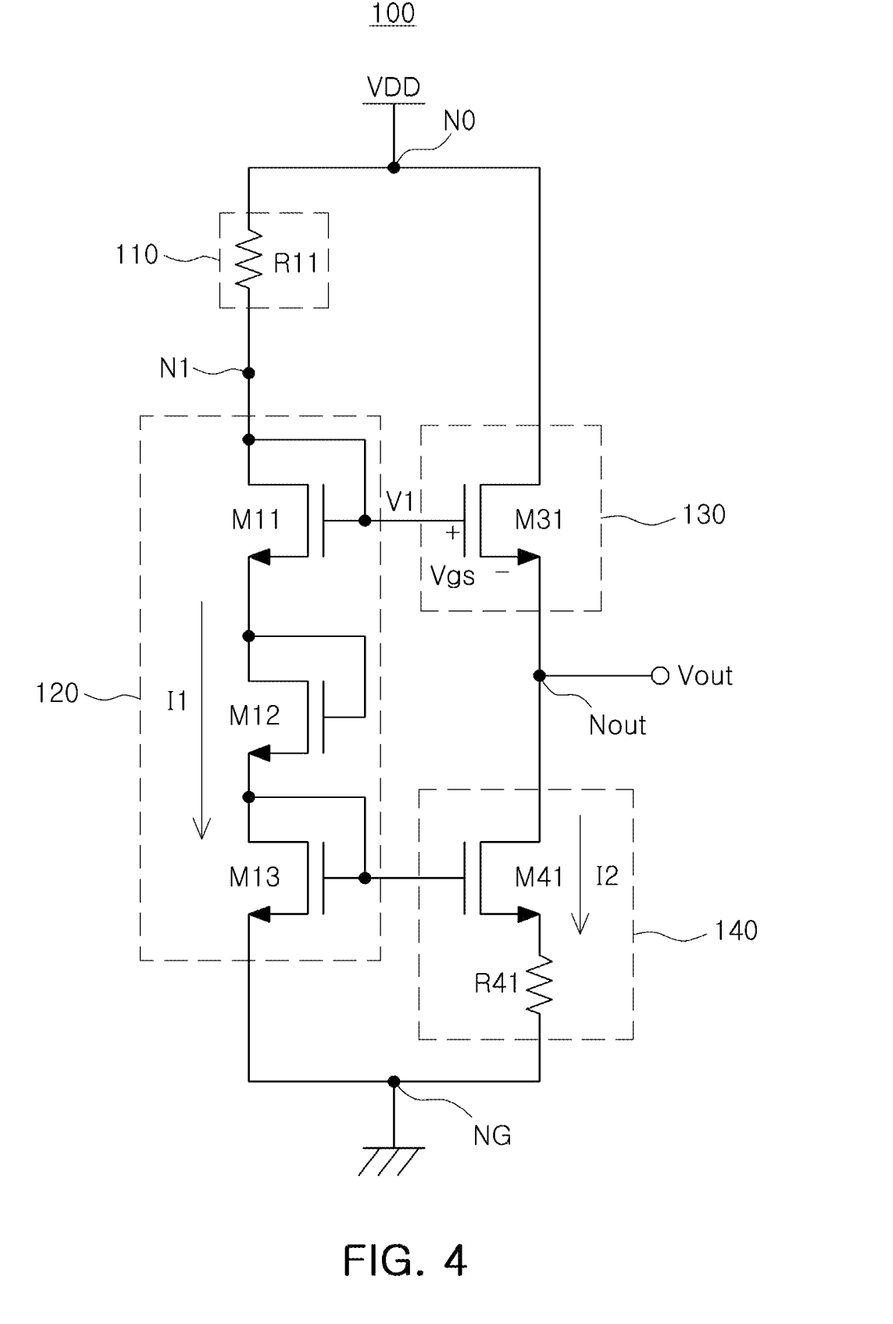
FIG. 4 illustrates an example regulator circuit, in accordance with one or more embodiments.

FIG. 2 illustrates an example regulator or regulation circuit 100, in accordance with one or more embodiments, FIG. 3 illustrates an example regulator or regulation circuit 100, in accordance with one or more embodiments, and FIG. 4 illustrates an example regulator or regulation circuit 100, in accordance with one or more embodiments.

Referring to FIGS. 2 to 4, the regulation circuit 100 may include a first current regulating circuit 110, a first voltage regulating circuit 120, a second voltage regulating circuit 130 and a second current regulating circuit 140.

The first current regulating circuit 110 is connected between a terminal N0 of the power supply voltage (VDD) and a first connection node N1, and may regulate a level of a first current I1.

The first voltage regulating circuit 120 is connected between the first connection node N1 and a ground node NG to receive the first current I1 and regulate a level of a first voltage V1.

The second voltage regulating circuit 130 may be connected between the power supply voltage (VDD) terminal N0 and an output node Nout, and may generate an output voltage Vout based on the first voltage V1.

The second current regulating circuit 140 is connected between the output node Nout and the ground node NG, and may stabilize the output voltage Vout.

On the other hand, in an example of a Complementary Metal-oxide Semiconductor (CMOS) process, considering that a source-drain breakdown voltage (BVds) of a MOS field-effect transistor (MOSFET) may be approximately 3.5V, in an example in which the battery voltage is directly received, a more stable voltage may be supplied.

In this example, the battery voltage may be more stably supplied through an internal regulator circuit without a power management IC (PMIC) disposed outside of the front-end module.

For respective drawings according to examples, unnecessary duplicate descriptions may be omitted for the same reference numerals and components having the same function, and details of differences for respective drawings may be described.

Referring to FIG. 2, in a non-limiting example, the first current regulating circuit 110 may include a first resistor R11 connected between the power supply voltage (VDD) terminal N0 and the first connection node N1. In this example, the first resistor R11 may regulate a level of the first current I1.

The first voltage regulating circuit 120 may be connected between the first connection node N1 and the ground node NG, and may include a first transistor M10 of which a drain and a gate are connected to each other.

The second voltage regulating circuit 130 may include an output transistor M31 having a drain connected to the power supply voltage (VDD) terminal N0, a gate connected to the first connection node (N1), and a source connected to the output node Nout.

The second current regulating circuit 140 may include a ground resistor R41 connected between the output node Nout and the ground node NG.

In an example, the second current regulating circuit 140 may provide a current bypass path between the output node Nout and the ground node, which may reduce a change in transient response characteristics at the output node Nout, thereby contributing to the stability of the output node.

Referring to FIG. 3, the first current regulating circuit 110 may include a first resistor R11 connected between the power supply voltage (VDD) terminal N0 and the first connection node N1.

The first voltage regulating circuit 120 may be connected between the first connection node N1 and the ground node NG, and may include a first transistor M10 of which a drain and a gate are connected to each other.

The second voltage regulating circuit 130 may include the output transistor M31 having a drain connected to the power supply voltage (VDD) terminal N0, a gate connected to the first current regulating circuit 110 through the first connection node N1, and a source connected to the output node Nout.

In a non-limiting example, the second current regulating circuit 140 may include a ground transistor M41 and the ground resistor R41.

The ground transistor M41 may include a drain connected to the output node Nout, and a source and a gate connected to the first voltage regulating circuit 120.

The ground resistor R41 may be connected between the source of the ground transistor M41 and the ground node NG. In this example, the ground resistor R41 may regulate a level of a second current I2.

Referring to FIG. 4, the first voltage regulating circuit 120 may include a first transistor M11, a second transistor M12, and a third transistor M13.

The first transistor M11 may include a drain connected to each of the first connection node N1 and the second voltage regulating circuit 130, a gate connected to the drain, and a source connected to a drain of the second transistor M12.

The second transistor M12 may include a drain connected to the source of the first transistor M11, a gate connected to the drain of the second transistor M12, and a source connected to the drain of the third transistor M13.

The third transistor M13 may include a drain connected to the source of the second transistor M12, a gate connected to the drain of the third transistor M13 and the second current regulating circuit 140, and a source connected to the ground node NG.

In an example, the first transistor M11, the second transistor M12, and the third transistor M13 may regulate a level of the first voltage V1.

In an example, in FIG. 4, in an example in which drain-source voltages Vds of the first transistor M11, the second transistor M12 and the third transistor M13 are the same, the first voltage V1 may be 3×Vds, and in this example, when Vds is 0.53V, the voltage V1 is 1.59 (V).

In this example, when Vgs of the output transistor M31 is 0.15(V), the output voltage (Vout=V1−Vgs) may be 1.44(V) (1.59(V)−0.15(V)).

As described above, it can be seen that the output voltage may be constantly supplied regardless of variations in the power supply voltage VDD, which is the voltage of the battery.

On the other hand, in FIGS. 2 to 4, a resistance value of the first resistor R11 may be higher than a resistance value of the ground resistor R41.

In an example, the higher the resistance values of the first resistor R11 and the ground resistor R41 are, the greater the current (I1+I2) consumption of the first current I1 and the second current I2 may be reduced. Therefore, it may be preferable that a resistance value is as high as possible. However, if the resistance value is too high, it may take a longer time for the first voltage to rise to the normal voltage, and thus, it may be necessary to set an appropriate value in consideration of the characteristics of the transient response.

In an example, the resistance value of the first resistor R11 may be 500K0, and the resistance value of the ground resistor R41 may be 250 KΩ.

Figure 5:
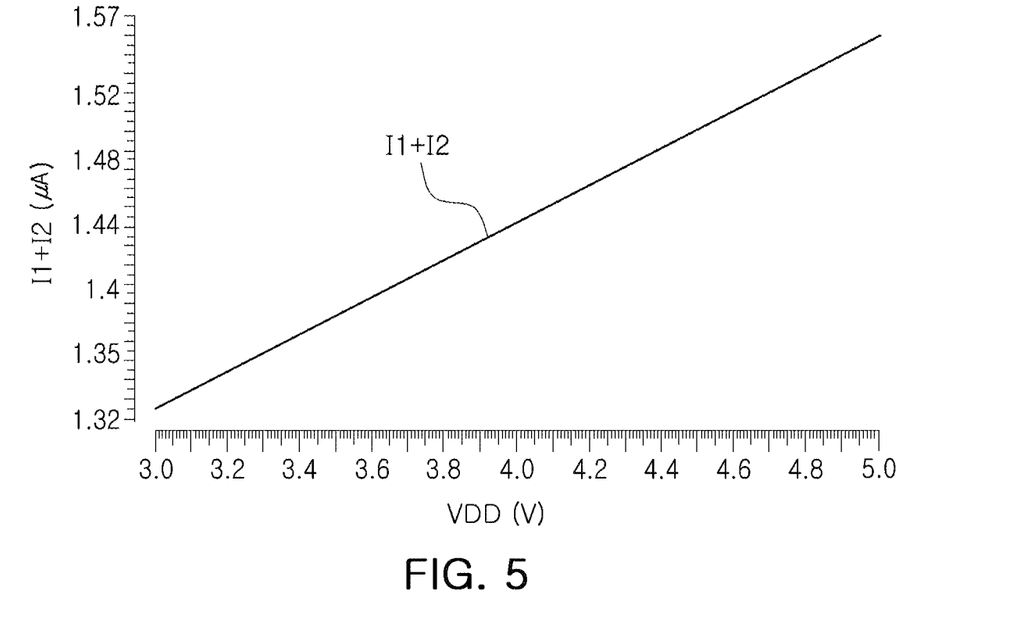
FIG. 5 illustrates an example of current consumption according to a power supply voltage, in accordance with one or more embodiments.
Figure 6:
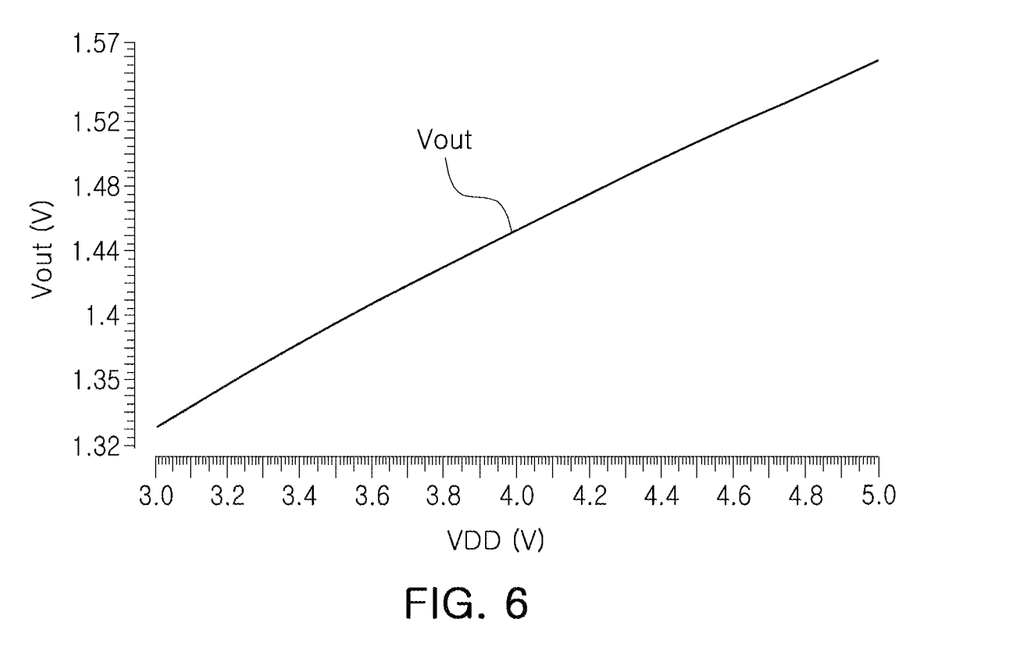
FIG. 6 illustrates an example of an output voltage according to a power supply voltage, in accordance with one or more embodiments.

FIG. 5 illustrates an example of current consumption according to a power supply voltage, and FIG. 6 illustrates an example of an output voltage according to a power supply voltage.

Referring to FIG. 5, when the current summing of the first current I1 and the second current I2 is referred to as a consumed current I1+I2, the consumed current I1+I2 is approximately 3.4 uA to 7.5 uA depending on a change in the power supply voltage VDD as illustrated in FIG. 5. Specifically, when an inverter performs on-off switching (an on/off operation), the inverter operates by receiving the output current supplied through the output node, and when maintained in one of the on/off switching operations (when in an idle mode), the current of 3.4 uA to 7.5 uA (=I1+I2) is consumed, which shows that the system design specification satisfies the current of 10 uA or less in the idle mode.

Referring to FIG. 6, the output voltage Vout shows a small change of about 0.23 V with respect to a change of 1.33 V to 1.56 V, in a range of 3 V to 5 V of the power supply voltage VDD, and thus, it can be seen that a more stable voltage is supplied.

As set forth above, according to examples, the Wi-Fi front-end module directly receives a battery voltage having a voltage variation to generate a regulated voltage therein, thereby preventing damage to internal circuits and components or devices. In addition, there is an advantage that the power consumption in the standby state may be reduced.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed to have a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A regulation circuit comprising:
   a first current regulating circuit, connected between a power supply voltage terminal and a first connection node, and configured to regulate a level of a first current;
   a first voltage regulating circuit, connected between the first connection node and a ground node, and configured to receive the first current to regulate a level of a first voltage;
   a second voltage regulating circuit, connected between the power supply voltage terminal and an output node, and configured to generate an output voltage based on the first voltage; and
   a second current regulating circuit, connected between the output node and the ground node, and configured to stabilize the output voltage,
   wherein the second current regulating circuit comprises a ground transistor, configured to have a drain connected to the output node, and a source and a gate connected to the first voltage regulating circuit.

2. The regulation circuit of claim 1, wherein the first current regulating circuit comprises a first resistor connected between the power supply voltage terminal and the first connection node.

3. The regulation circuit of claim 2, wherein the second current regulating circuit further comprises:
   a ground resistor connected between the source of the ground transistor and the ground node.

4. The regulation circuit of claim 3, wherein a resistance value of the first resistor is higher than a resistance value of the ground resistor.

5. The regulation circuit of claim 1, wherein the first voltage regulating circuit is connected between the first connection node and the ground node, and comprises a first transistor of which a drain and a gate are commonly connected.

6. The regulation circuit of claim 1, wherein the first voltage regulating circuit comprises:
   a first transistor, respectively connected to the first connection node and the second voltage regulating circuit, and configured to have a drain and a gate commonly connected to each other;
   a second transistor, connected to a source of the first transistor, and configured to have a drain and a gate commonly connected to each other; and
   a third transistor connected to a source of the second transistor, configured to have a drain and a gate commonly connected to each other, and configured to have a source connected to the ground node.

7. The regulation circuit of claim 1, wherein the second voltage regulating circuit comprises an output transistor having a drain connected to the power supply voltage terminal, a gate connected to the first connection node, and a source connected to the output node.

8. The regulation circuit of claim 1, wherein the second current regulating circuit comprises a ground resistor connected between the output node and the ground node.

9. A front-end module comprising:
   a regulation circuit, configured to generate a regulated voltage based on a power supply voltage; and
   a decoder, configured to receive the regulated voltage from the regulation circuit,
   wherein the regulation circuit comprises:
   a first current regulating circuit, connected between a power supply voltage terminal and a first connection node, and configured to regulate a level of a first current, a first voltage regulating circuit, connected between the first connection node and a ground node, and configured to receive the first current to regulate a level of a first voltage, a second voltage regulating circuit, connected between the power supply voltage terminal and an output node, and configured to generate an output voltage based on the first voltage, and a second current regulating circuit, connected between the output node and the ground node, and configured to stabilize the output voltage, wherein the second current regulating circuit comprises a ground transistor, configured to have a drain connected to the output node, and a source and a gate connected to the first voltage regulating circuit.

10. The front-end module of claim 9, wherein the first current regulating circuit comprises a first resistor connected between the power supply voltage terminal and the first connection node.

11. The front-end module of claim 10, wherein the second current regulating circuit further comprises:

a ground resistor connected between the source of the ground transistor and the ground node.

12. The front-end module of claim 11, wherein a resistance value of the first resistor is higher than a resistance value of the ground resistor.

13. The front-end module of claim 9, wherein the first voltage regulating circuit is connected between the first connection node and the ground node, and comprises a first transistor having a drain and a gate commonly connected to each other.

14. The front-end module of claim 9, wherein the first voltage regulating circuit comprises:

a first transistor, respectively connected to the first connection node and the second voltage regulating circuit and configured to have a drain and a gate commonly connected to each other;

a second transistor, connected to a source of the first transistor, and configured to have a drain and a gate commonly connected to each other; and a third transistor connected to a source of the second transistor, and configured to have a drain and a gate commonly connected to each other, and a source connected to the ground node.

15. The front-end module of claim 9, wherein the second voltage regulating circuit comprises an output transistor having a drain connected to the power supply voltage terminal, a gate connected to the first connection node, and a source connected to the output node.

16. The front-end module of claim 9, wherein the second current regulating circuit comprises a ground resistor connected between the output node and the ground node.

17. A communication device comprising:

a front-end module comprising a regulation circuit and a decoder, wherein the regulation circuit comprises:

a first current regulator, connected to a power supply voltage, and configured to regulate a level of a first current;

a first voltage regulator, connected between the first current regulator and a ground, and configured to receive the first current, and regulate a level of a first voltage;

a second voltage regulator, connected to the power supply voltage, and configured to generate an output voltage based on the first voltage; and a second current regulator, connected between the second voltage regulator and the ground, and configured to stabilize the output voltage, wherein the second current regulator comprises a ground transistor, configured to have a drain connected to an output node, and a source and a gate connected to the first voltage regulator.

18. The device of claim 17, wherein the first current regulator includes a first resistor, and the second current regulator includes a ground resistor, and a resistance value of the first resistor is greater than a resistance value of the ground resistor.

* * * * *